US010361648B2

(12) United States Patent
Wang (10) Patent No.: US 10,361,648 B2
(45) Date of Patent: Jul. 23, 2019

(54) SYSTEM AND METHOD FOR STARTING SYNCHRONOUS MOTORS

(71) Applicant: Microchip Technology Incorporated, Chandler, AZ (US)

(72) Inventor: Weizi Wang, Shanghai (CN)

(73) Assignee: MICROCHIP TECHNOLOGY INCORPORATED, Chandler, AZ (US)

(*) Notice: Subject to any disclaimer, the term of this patent is extended or adjusted under 35 U.S.C. 154(b) by 0 days.

(21) Appl. No.: 15/802,246

(22) Filed: Nov. 2, 2017

(65) Prior Publication Data

US 2018/0131305 A1 May 10, 2018

(30) Foreign Application Priority Data

Nov. 9, 2016 (CN) .......................... 2016 1 0987245

(51) Int. Cl.
*H02P 6/00* (2016.01)
*H02P 21/00* (2016.01)
*H02P 21/18* (2016.01)
*H02P 6/04* (2016.01)
*H02P 6/18* (2016.01)
(Continued)

(52) U.S. Cl.
CPC ............ *H02P 21/0021* (2013.01); *H02P 6/04* (2013.01); *H02P 6/18* (2013.01); *H02P 6/181* (2013.01); *H02P 21/0089* (2013.01); *H02P 21/18* (2016.02); *H02P 21/34* (2016.02); *H02P 1/029* (2013.01); *H02P 21/10* (2013.01)

(58) Field of Classification Search
CPC ........ H02P 21/18; H02P 6/04; H02P 21/0021; H02P 21/34; H02P 6/18; H02P 21/0089; H02P 21/10; H02P 1/029

USPC .......................................................... 318/721
See application file for complete search history.

(56) References Cited

U.S. PATENT DOCUMENTS 9,369,073 B1 * 6/2016 Tian ........................ H02P 6/20
2005/0218862 A1 10/2005 Huggett et al. ............... 318/722
(Continued)

OTHER PUBLICATIONS

Kim, Tae-Hyung et al., "Sensorless Control of the BLDC Motors from Near-Zero to High Speeds," IEEE Transactions on Power Electronics, vol. 19, No. 6, pp. 1635-1645, Nov. 1, 2004.
(Continued)

*Primary Examiner* — Eduardo Colon Santana
*Assistant Examiner* — Gabriel Agared
(74) *Attorney, Agent, or Firm* — Slayden Grubert Beard PLLC (57) ABSTRACT

To avoid control failure resulting from startup of a PMSM that is windmilling, initial speed and position are determined before startup. A controller uses a FOC routine having a speed PI control loop, field-weaken control, a current PI control loop, and a speed observer. When the controller receives an instruction to start the PMSM, it delays startup and executes an "estimation" stage, in which the controller executes the FOC routine but with the speed PI control loop and the field-weaken control disabled. The estimation stage is repeated multiple times, with estimates converging to actual speed and position through successive iterations. When estimated speed and position values have stabilized, the motor is started using the estimates as initial speed and position for driving the PMSM. The FOC routine, with the speed PI control loop and the field-weaken control enabled, is used to drive the PMSM.

20 Claims, 9 Drawing Sheets

(51) Int. Cl.
*H02P 21/34* (2016.01)
*H02P 1/02* (2006.01)
*H02P 21/10* (2016.01)

(56) References Cited

U.S. PATENT DOCUMENTS

| | | | |
|---|---|---|---|
| 2006/0097688 A1 | 5/2006 | Patel et al. | 318/778 |
| 2010/0045218 A1* | 2/2010 | Tomigashi | H02P 6/183 318/400.02 |
| 2013/0088179 A1* | 4/2013 | Kobayashi | H02P 21/06 318/400.02 |
| 2013/0249448 A1* | 9/2013 | Kobayashi | H02P 21/141 318/400.02 |
| 2013/0320889 A1* | 12/2013 | Zhang | H02K 21/14 318/400.02 |
| 2014/0232304 A1* | 8/2014 | Sekiya | H02P 3/18 318/400.02 |
| 2016/0359442 A1* | 12/2016 | Zhao | H02P 21/0021 |
| 2017/0093324 A1* | 3/2017 | Saha | H02M 1/36 |

OTHER PUBLICATIONS

International Search Report and Written Opinion, Application No. PCT/US2017/060773, 15 pages, Jan. 25, 2018.

Cheles, Mihai, "Sensorless Field Oriented Control (FOC) for a Permanent Magnet Synchronous Motor (PMSM) Using a PLL Estimator and Field Weakening (FW)" Microchip Technology Incorporated, URL: http://ww1.microchip.com/downloads/en/AppNotes/01292A.pdf, 20 pages, 2009.

Zambada, Jorge et al., "AN1078: Sensorless Field Oriented Control of a PMSM," Microchip Technology Incorporated, URL: http://ww1.microchip.com/downloads/en/AppNotes/01078B.pdf, 28 pages, Jan. 5, 2010.

* cited by examiner

SYSTEM AND METHOD FOR STARTING SYNCHRONOUS MOTORS

PRIORITY

This application claims priority to Chinese Patent Application No: 2016109872457, filed Nov. 9, 2016, the contents of which are incorporated herein in their entirety.

TECHNICAL FIELD

The present disclosure relates generally to the startup of synchronous motors that are susceptible to rotation before startup, and more specifically to the startup of three-phase permanent magnet synchronous motors (PMSMs) that do not have sensors for receiving information on initial position (angle) and/or rotational speed of their rotors, but that may be windmilling at startup.

BACKGROUND

Permanent magnet synchronous motors (PMSMs) are a popular choice among device manufacturers because of their high power density, fast dynamic response, and high efficiency in comparison with other motors in their category. With PMSMs, the rotor field speed must be equal to the stator (armature) field speed (i.e., synchronous). The loss of synchronization between the rotor and stator fields can cause the motor to halt, and so knowing rotor speed and position can be critical in avoiding control failures in such motors. Conventional approaches to determining position and speed of rotors include the use of encoders, such as resolver encoders, incremental ABZ encoders, absolute position encoders, and sin/cos encoders, but these increase costs and space requirements. Hall effect sensors are sometimes used, but these increase costs and have low reliability. Three-phase motor terminal voltage sensing circuits can also be used, but these place a demand on the resources of the controller used to operate the motor. For example, a traditional control method involves driving the stator in a six-step process to generate oscillations on the produced torque. In such six-step control, a pair of windings is energized until the rotor reaches the next position, and then the motor is commutated to the next step. Hall sensors can be used to determine the rotor position to electronically commutate the motor.

To keep costs down, motors without encoders and Hall sensors—referred to as "sensorless" motors"—are often used. To compensate for the lack of these sensors, sensorless motors may implement algorithms that use the back-EMF (back electromotive force) generated in the stator winding to determine rotor position. Other sensorless motors use a speed observer to estimate rotor speed and position during driving. In some applications, however, a motor may be able to rotate even after its controller ceases operation. That is, the motor may be rotated by an outside load torque, or the motor may keep rotating as a result of its own inertia after the controller has stopped operating the motor. Such motors generally do not have brakes that stop the motor from rotating once it is no longer being driven. When the rotor is able to rotate on its own before startup (i.e., is susceptible to windmilling), the controller does not know the rotor's initial position and speed at time of startup. Although sensorless motors may be able to use back-EMF or a speed observer to determine or estimate rotor position and/or speed while the motor is driven, these approaches do not provide information on initial speed and position of windmilling motors before the motor has started up.

Some sensorless motors use field-oriented control (FOC) vector algorithms without measuring the motor speed, position, torque, and voltage. This is common in such applications as air conditioning units, ceiling fans, pumps, electric bicycles, hand dryers, wind power generators, and unmanned aerial vehicles like drones. A motor controller/microcontroller ("MCU") and inverter is often used to drive such PMSMs. Because the rotors of these motors may have an initial "free-running" speed before the controller starts the motor, the initial free-running speed and rotor position are unknown to the controller/MCU. This makes it difficult to run the motor smoothly, and it has reduced the applicability of sensorless FOC for PMSMs.

Effective control of PMSMs requires knowledge of the initial position and speed of the PMSM at time of motor startup. Current systems use encoders or Hall sensors to measure speed/position, or additional sensing circuitry to measure motor phase voltages; these make the system more complex and expensive. What is needed is an economical method and system for estimating position and/or speed of a PMSM before startup when such information is not available from sensor readings.

SUMMARY

The disclosed invention involves estimation of position and speed of a synchronous motor before the motor is started. In exemplary embodiments, a controller ("MCU") controls a permanent magnet synchronous motor (PMSM) using a field-oriented control (FOC) vector control routine that includes a speed proportional-integral (PI) control loop, a field-weaken control, a current PI control loop, and a speed observer. When the MCU receives an instruction to begin running the PMSM, it delays startup for a delay period so that it can execute a measure-and-synchronize ("MAS") or "estimation" stage. In the MAS stage, the MCU executes the FOC vector control routine that is normally used to run the motor, but the MCU deactivates the speed PI control loop and the field-weaken control in the FOC vector control routine. The speed PI control loop and field-weaken control are effectively deactivated by setting the currents output by the speed PI control loop and the field-weaken control (and used by other modules in the FOC vector control routine) to substantially zero (or to a constant low value).

The MAS stage can be executed multiple times during the delay period, with each iteration providing an estimate for speed and position. In each iteration of the MAS stage, the speed observer of the FOC vector control routine receives current measurements from the PMSM and voltages from the current PI control loop as inputs, and it provides estimates for speed and position as outputs. The estimated speed and position values output by the speed observer varies with each iteration of the MAS stage, with the estimates for speed and position converging to the actual speed and position of the PMSM as the MAS stage is repeated.

Once the estimated speed and position has stabilized—i.e., when the variation in estimated speed and position through subsequent iterations of the MAS stage is acceptably small—the delay period can be terminated. At the end of the delay period, the MCU starts running the PMSM using the FOC vector control routine, but with the speed PI control loop and flux-weaken control reactivated. The final estimated values for speed and position at the end of the delay period are used as the initial speed and position when the controller begins driving the PMSM. Optionally, it can be determined whether the motor is windmilling before or after executing the MAS stage.

Estimating speed and/or position using a MAS stage before motor startup greatly enhances control of synchronous motors, without the need to use sensors to measure position and speed. In the MAS stage, a zero-current command can eliminate torque shock when the controller starts the motor. In this stage, the speed observer analyzes and estimates rotor speed and position in real time, providing a delay period during which the controller is able to synchronize its algorithm with the motor. Advantageously, such a startup can be realized using the PMSM's microcontroller, without the need for additional hardware.

Further advantages and features of the invention will be apparent from the remainder of this document in conjunction with the associated drawings.

BRIEF DESCRIPTION OF THE DRAWINGS

FIG. 2A illustrates a Clarke Transform.

FIG. 4A illustrates an Inverse Clarke Transform.

Although specific exemplary embodiments are shown in the drawings and are herein described in detail, it should be understood that the description herein of specific example embodiments is not intended to limit the disclosure to the particular forms disclosed herein.

DETAILED DESCRIPTION

This invention is related to the startup of three-phase permanent magnet synchronous motors (PMSMs) driven under field-oriented control ("FOC"). FOC vector control of motors is a control method in which the stator currents of a three-phase AC electric motor are characterized by the magnetic flux of the motor and its torque. FOC is a method by which one of the fluxes (rotor, stator, or air gap) is treated as a basis for creating a reference frame for one of the other fluxes with the purpose of decoupling the torque and flux-producing components of the stator current. Such decoupling helps assure ease of control for complex three-phase motors in the same manner as DC motors with separate excitation. Armature current may be used for torque generation, and excitation current may be used for flux generation. In certain applications, the rotor flux may be considered as a reference frame for the stator and air gap flux. The principles behind FOC are discussed in the literature, including several application notes from Microchip Technology Inc., such as AN1078, "Sensorless Field Oriented Control of a PMSM" (2010), and AN1292, "Sensorless Field Oriented Control (FOC) for a Permanent Magnet Synchronous Motor (PMSM) Using a PLL Estimator and Field Weakening (FW) Controllers" (2009), both of which are incorporated by reference herein.

Figure 1:
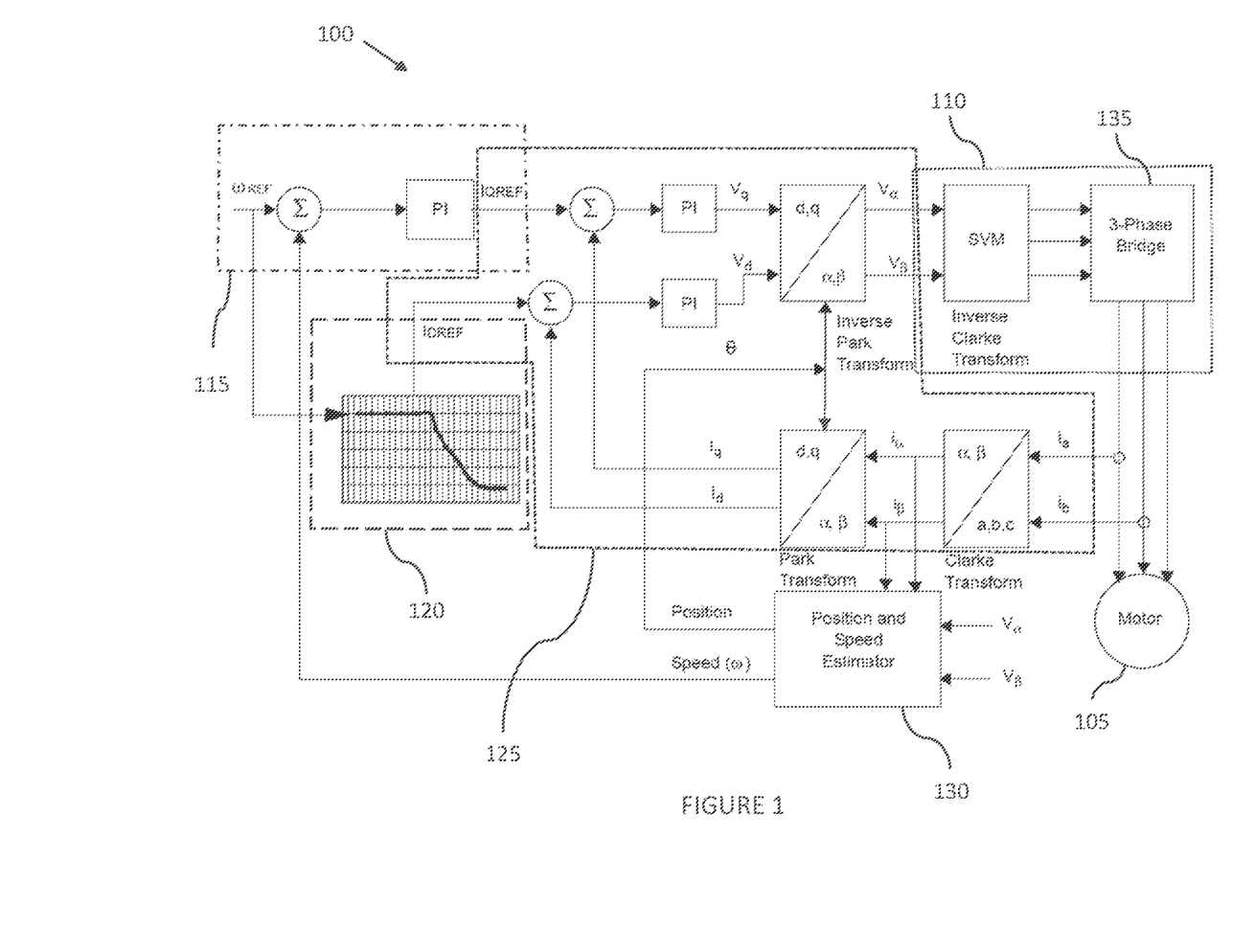
FIG. 1 is a block-diagram representation of a sensorless field-oriented control (FOC) algorithm for driving a permanent magnet synchronous motor (PMSM).

Referring initially to the block diagram for sensorless FOC vector control in FIG. 1, a PMSM 105 receives currents from a 3-phase bridge 135, which may include a rectifier, an inverter, and acquisition and protection circuitry. The indirect vector control process, which can be implemented using software executed by a microcontroller ("MCU"), can be summarized as follows. One, the three-phase stator currents are measured to provide values for $i_a$ and $i_b$. The value for $i_c$ can be calculated using the equation $i_a+i_b+i_c=0$. Two, the 3-phase currents are converted to a two-axis system. This conversion provides the variables $i_\alpha$ and $i_\beta$ using the measured $i_a$ and $i_b$ values, and the calculated $i_c$ value; $i_\alpha$ and $i_\beta$ are time-varying quadrature current values as viewed from the perspective of the stator. Three, the two-axis coordinate system is rotated to align with the rotor flux using the transformation angle calculated at the last iteration of the control loop. This conversion provides the $I_d$ and $I_q$ variables from $i_\alpha$ and $i_\beta$. $I_d$ and $I_q$ are the quadrature currents transformed to the rotating coordinate system. For steady state conditions, $I_d$ and $I_q$ are constant.

Four, error signals are formed using $I_d$ and $I_q$, along with reference values for each. The $I_d$ reference is involved in the control of rotor magnetizing flux, and the $I_q$ reference is involved in the control of the torque output of the motor. The error signals are input to PI controllers. The outputs of the controllers provide $V_d$ and $V_q$, which are voltage vectors that will be sent to the motor. Five, the transformation angle is estimated, in which $v_\alpha$, $v_\beta$, $i_\alpha$, and $i_\beta$ are the inputs. The transformation angle guides the FOC algorithm as to where to place the next voltage vector. Six, the $V_d$ and $V_q$ output values from the PI controllers are rotated back to the stationary reference frame using the transformation angle. This calculation provides the next quadrature voltage values $v_\alpha$ and $v_\beta$. And seven, the $v_\alpha$ and $v_\beta$ values are transformed back to 3-phase values $v_a$, $v_b$, and $v_c$. The 3-phase voltage values are used to calculate new pulse width modulation (PWM) duty cycle values that generate the desired voltage vector. The process of transforming, PI iteration, transforming back, and generating PWM is illustrated in FIG. 1. Additional details for this indirect vector control process will now be provided.

Figure 2A:
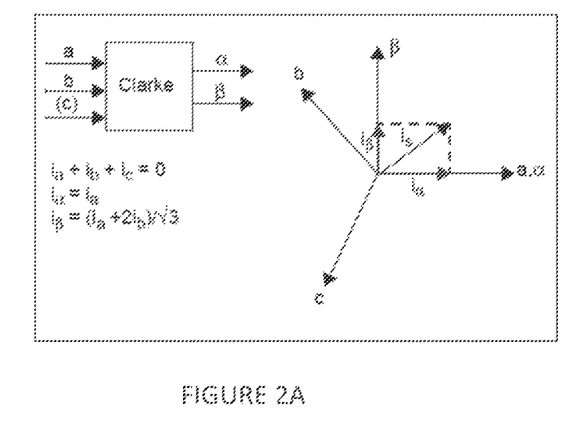
Figure 2B:
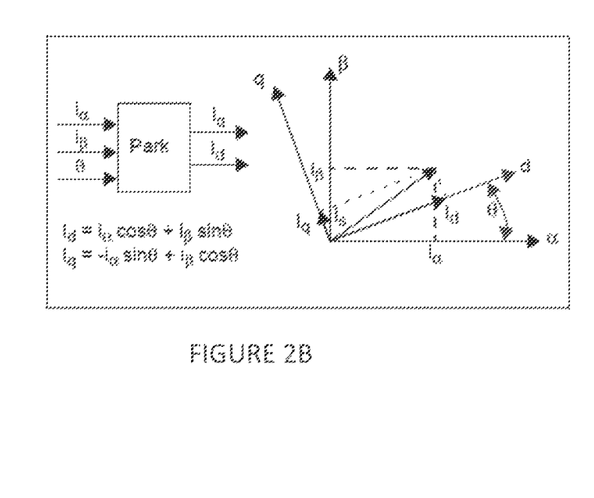
FIG. 2B illustrates a Park Transform, both of which are used in the FOC algorithm of FIG. 1.

Through a series of coordinate transforms, the time invariant values of torque and flux can be indirectly determined and controlled with classic PI control loops. The process begins by measuring the 3-phase motor currents. First, the Clarke Transform moves a three-axis, two-dimensional coordinate system, referenced to the stator, onto a two-axis system, keeping the same reference (see FIG. 2A, where $i_a$, $i_b$, and $i_c$ are the individual phase currents). With the stator current represented on a two-axis orthogonal system with the α-β axis, the next step is to transform into another two-axis system that is rotating with the rotor flux. This transformation uses the Park Transform, as illustrated in FIG. 2B. This two-axis rotating coordinate system is called the d-q axis. Here, θ represents the rotor angle.

Figure 3:
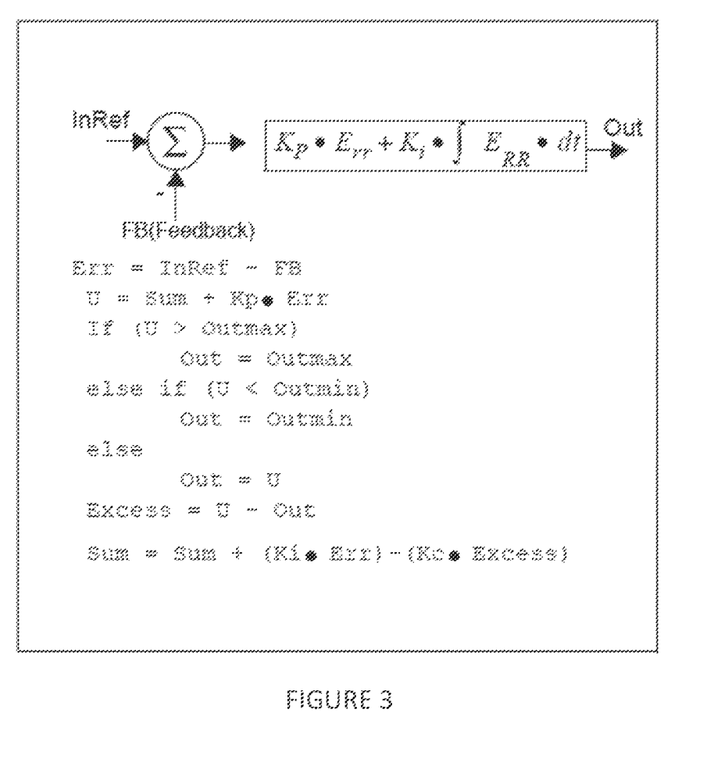
FIG. 3 illustrates how the proportional-integral (PI) control loops of the FOC algorithm of FIG. 1 can be implemented.
Figure 4A:
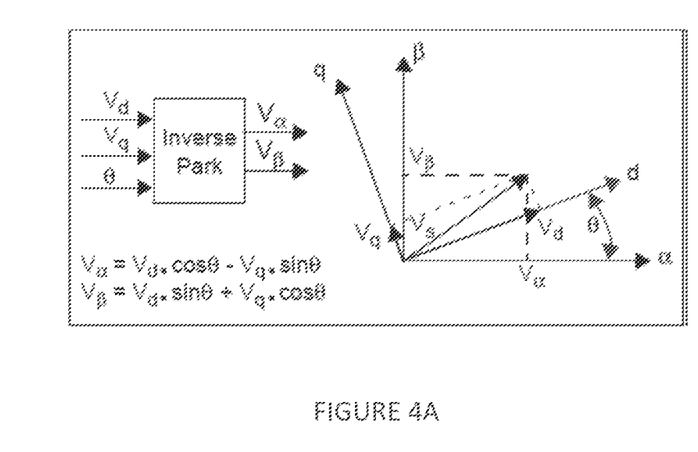
Figure 4B:
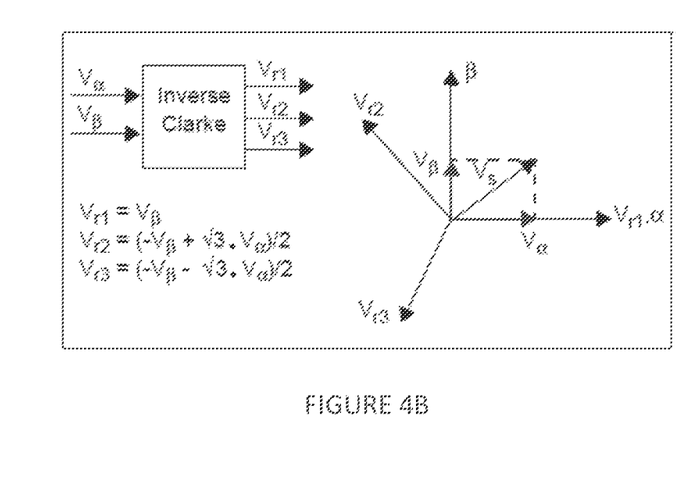
FIG. 4B illustrates an Inverse Park Transform, both of which are used in the FOC algorithm of FIG. 1.

There are three interdependent PI control loops for controlling three interactive variables independently: the rotor speed, rotor flux, and rotor torque, each controlled by a separate PI module. Specifically, one PI loop is for controlling motor velocity, and two are for controlling the transformed motor currents, $I_d$ and $I_q$. The $I_d$ loop is involved in controlling flux, and the $I_q$ value is involved in controlling the motor torque. The implementation includes term "Kc-Excess" to limit integral windup, as illustrated in FIG. 3. "Excess" is calculated by subtracting the unlimited output (U) and limited output (Out). The term Kc multiplies the Excess and limits the accumulated integral portion (Sum). After the PI iteration, there are two voltage component vectors in the rotating d-q axis. Complementary inverse transforms are used to return to the 3-phase motor voltage. First, the process transforms from the two-axis rotating d-q frame to the two-axis stationary frame α-β. This transformation uses the Inverse Park Transform illustrated in FIG. 4A. Next, the process transforms from the stationary two-axis α-β frame to the stationary three-axis, 3-phase reference frame of the stator. Mathematically, this transformation is accomplished with the Inverse Clarke Transform illustrated in FIG. 4B.

The final step in the vector control process is to generate pulse-width modulation (PWM) signals for each of the 3-phase motor voltage signals, which can be accomplished using Space Vector Modulation (SVM) techniques. To simplify the process, the Inverse Clarke Transform can be folded into the SVM routine. Each of the three inverter outputs can be in one of two states. The inverter output can be connected to either the plus (+) bus rail or the minus (−) bus rail, allowing for two-cubed (i.e., 8) possible states of the output, as shown in Table 1:

TABLE 1

| Phase C | Phase B | Phase A | $V_{ab}$ | $V_{bc}$ | $V_{ca}$ | $V_{ds}$ | $V_{qs}$ | Vector |
|---|---|---|---|---|---|---|---|---|
| 0 | 0 | 0 | 0 | 0 | 0 | 0 | 0 | U(000) |
| 0 | 0 | 1 | $V_{DC}$ | 0 | $-V_{DC}$ | $2/3V_{DC}$ | 0 | $U_0$ |
| 0 | 1 | 1 | 0 | $V_{DC}$ | $-V_{DC}$ | $V_{DC}/3$ | $V_{DC}/3$ | $U_{60}$ |
| 0 | 1 | 0 | $-V_{DC}$ | $V_{DC}$ | 0 | $-V_{DC}/3$ | $V_{DC}/3$ | $U_{120}$ |
| 1 | 1 | 0 | $-V_{DC}$ | 0 | $V_{DC}$ | $-2V_{DC}/3$ | 0 | $U_{180}$ |
| 1 | 0 | 0 | 0 | $-V_{DC}$ | $V_{DC}$ | $-V_{DC}/3$ | $-V_{DC}/3$ | $U_{240}$ |
| 1 | 0 | 1 | $V_{DC}$ | $-V_{DC}$ | 0 | $V_{DC}/3$ | $-V_{DC}/3$ | $U_{300}$ |
| 1 | 1 | 1 | 0 | 0 | 0 | 0 | 0 | U(111) |

Figure 5A:
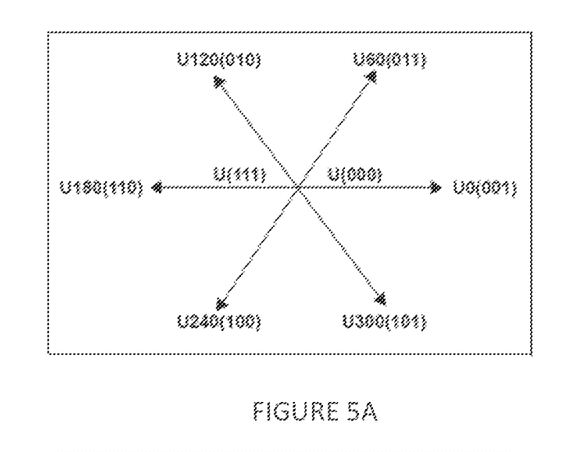
FIG. 5A shows a space vector modulation (SVM) "star" representing six of the eight possible states of the inverter outputs.
Figure 5B:
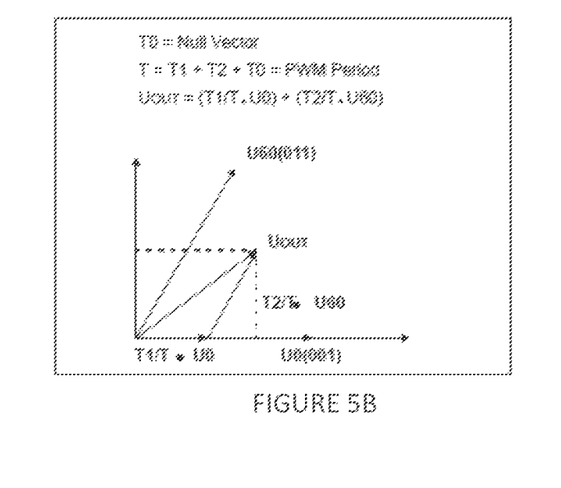
FIG. 5B represents the SVM process, in which a resultant vector is represented by the sum of the components of the two adjacent vectors.

The two states in which all three outputs are connected to either the plus (+) bus or the minus (−) bus are considered null states because there is no line-to-line voltage across any of the phases. These are plotted at the origin of the SVM star. The remaining six states are represented as vectors with 60-degree rotation between each state, as shown in FIG. 5A. The SVM process allows for the representation of any resultant vector by the sum of the components of the two adjacent vectors. In FIG. 5B, UOUT is the desired resultant. It lies in the sector between U60 and U0. If, during a given PWM period T, U0 is output for T1/T and U60 is output for T2/T, the average for the period will be UOUT. T0 represents a time where no effective voltage is applied to the windings; that is, where a null vector is applied. The values for T1 and T2 can be extracted with no extra calculations by using a modified Inverse Clarke Transform. If $V_\alpha$ and $V_\beta$ are reversed, a reference axis is generated that is shifted by 30 degrees from the SVM star. As a result, for each of the six segments, one axis is exactly opposite that segment and the other two axes symmetrically bound the segment. The values of the vector components along those two bounding axes are equal to T1 and T2.

Figure 6:
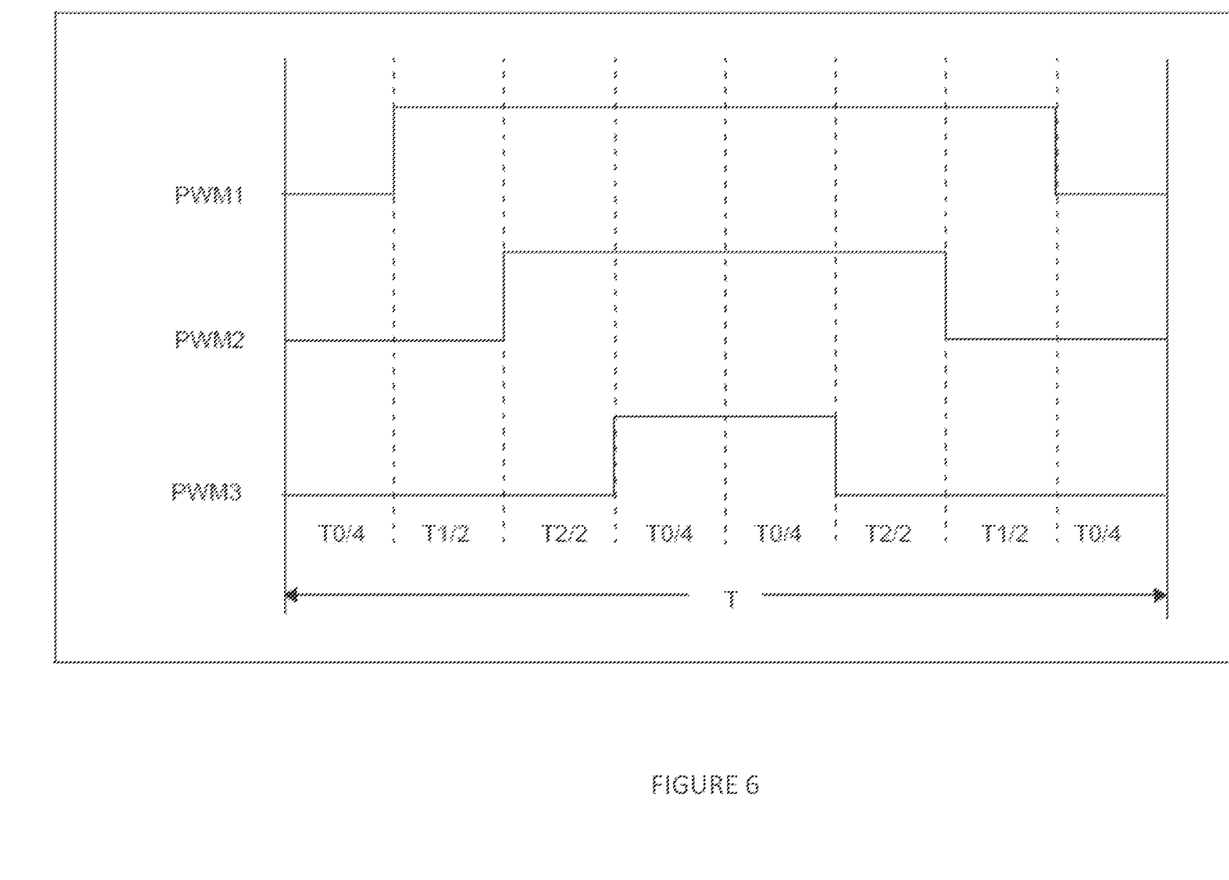
FIG. 6 represents a pulse width modulation (PWM) period T, in which a vector T1 is output for T1/T, a vector T2 is output for T2/T, and null vectors are output the remaining time.

In can be seen in FIG. 6 that for the PWM period T, the vector T1 is output for T1/T and the vector T2 is output for T2/T. During the remaining time the null vectors are output. The microcontroller can be configured for center-aligned PWM, which forces symmetry about the center of the period. This configuration produces two pulses line-to-line during each period. The effective switching frequency is doubled, reducing the ripple current without increasing the switching losses in the power devices.

Figure 7:
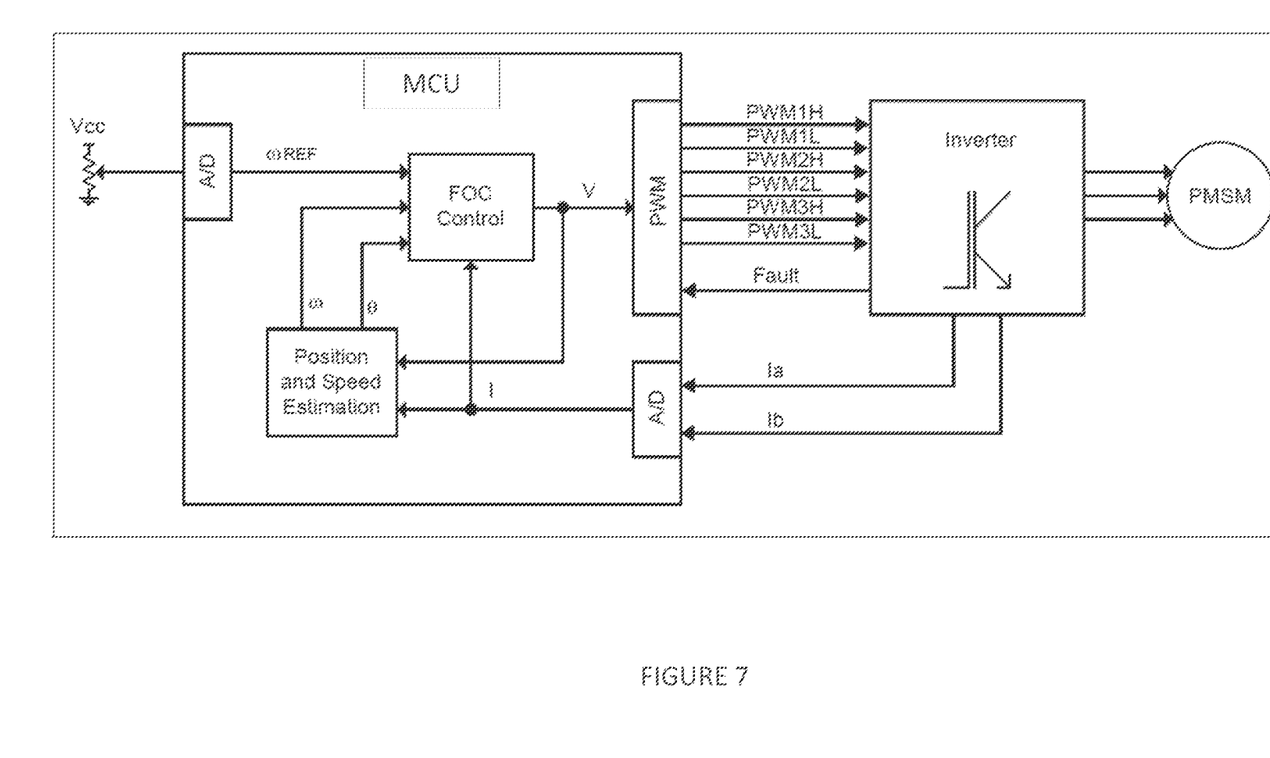
FIG. 7 provides a position estimator function block diagram. Motor position and speed can be estimated based on measured currents and calculated voltages in the FOC algorithm of FIG. 1.

To estimate commutation angle (θ) and motor speed (ω), the sensorless control technique implements the FOC algorithm by estimating the position of the motor without using position sensors. FIG. 7 illustrates a simplified block diagram of the position estimator function. Motor position and speed are estimated based on measured currents and calculated voltages.

Figure 8:
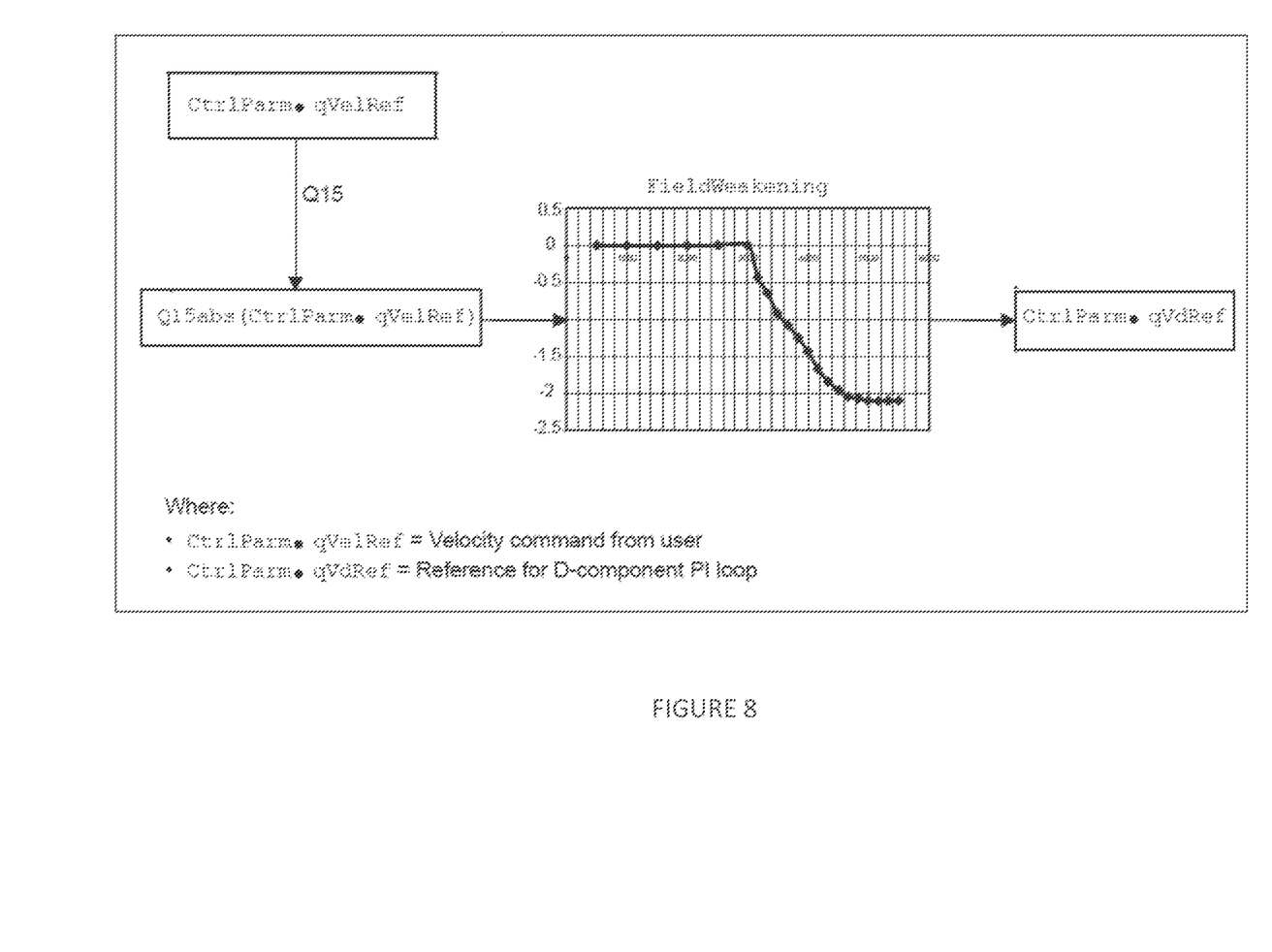
FIG. 8 represents a functional block diagram for a field weakening process.

The field weakening control for the PMSM implies imposing a negative value for the stator current on the d-axis of the rotating frame, which has the role of weakening the air gap flux linkage. In the case of an inverter, the voltage output drops on the stator's resistance and inductive reactance, and the remaining voltage is used to counteract back-EMF, which is proportional to the motor's speed and the voltage constant, KΦ, of the motor. Considering the inverter's limitation of maximum output voltage, an increase in speed (above nominal speed) can be achieved by decreasing the voltage constant (KΦ), which is proportional with the air gap flux linkage. A decrease in air gap flux linkage is synonymous to the decrease in torque. However, for certain applications, the motor needs to run higher than the rated speeds and therefore, the field weakening feature is useful for increasing the speed range of motor beyond its nominal speed rating. FIG. 8 illustrates the block diagram of field weakening, in which the y-axis is $I_d$ in amps, and the x-axis is speed is revolutions per minute (RPM).

Figure 9:
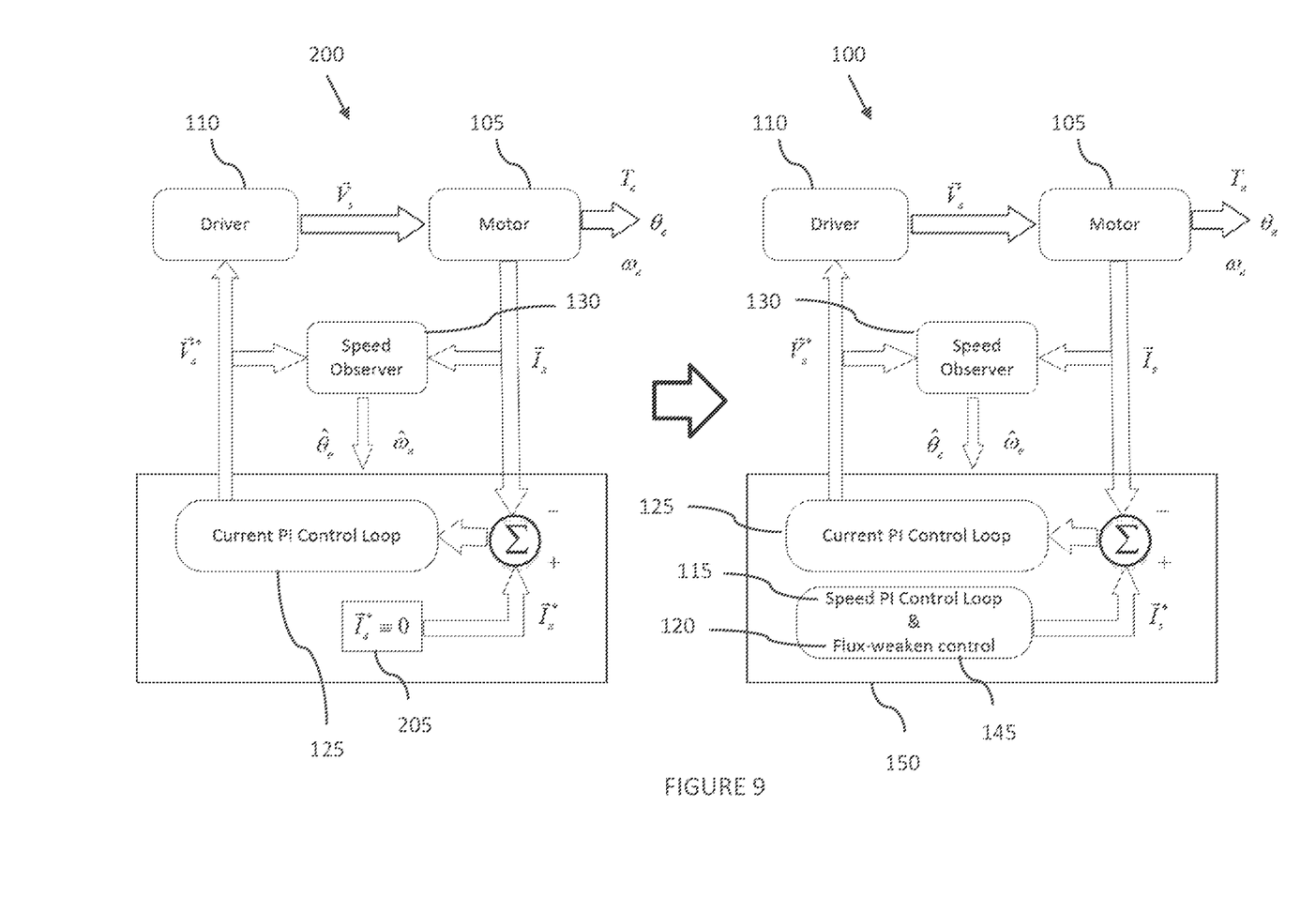
FIG. 9 provides the simplified block-diagram representation of the FOC algorithm of FIG. 1, modified on the left-hand side (a measure-and-synchronize ("MAS") stage) to deactivate the speed PI control loop and the flux-weaken control, and unmodified on the right-hand side (which illustrates the FOC vector control routine used to drive the PMSM on an ongoing basis).

Referring to FIG. 9, exemplary embodiments of the invention enhance startup of 3-phase PMSMs 105 under sensorless FOC vector control routine 100. Normally, such applications only measure the motor current, without measuring the motor speed, position, torque, and voltage, so as to keep costs down. A controller (MCU)—e.g., a digital signal controller (DSC), or a microcontroller with a digital signal processor (DSP)—will be used as part of the driver 110 for the PMSM 105. The stage 100 represents the sensorless FOC vector control routine that is used to drive the PMSM as it normally runs. Driver 110 includes a pulse width modulator (PWM) and an inverter drive unit; it is the actuator responsible for realizing the voltage vector command ($\vec{V}_s^*$) from the real three-phase voltage vector ($\vec{V}_s$) applied to motor phases. When $\vec{V}_s$ applied to PMSM 105, the PMSM 105 will yield motor current $\vec{I}_s$, torque $T_e$, rotor position $\theta_e$, and rotor rotating speed $\omega_e$.

In the PMSM sensorless FOC vector control routine 100, the rotor position, speed, and torque are unknown to the MCU because the system does not include the corresponding sensors (such as Hall sensors, ABZ encoders, etc.) for measuring them. The only measured response that may be available to the MCU is the motor current vector $\vec{I}_s$. Motor current can be measured using any suitable current sensor, such as an LEM current sensor, and the MCU can convert measured currents to a total motor current vector. Because rotor position and speed are essential to PMSM FOC vector control routine, in sensorless control modes, the speed observer 130 is used to estimate the rotor speed and position. The speed observer 130 is an adaptive algorithm, which is based on control theory and electrical motor mathematical modeling, that receives $\vec{V}_s^*$ and $\vec{I}_s$ as inputs and provides estimated speed $\hat{\omega}_e$ and position $\hat{\theta}_e$ as outputs. During subsequent control loops, the estimated speed and position outputs will converge to actual motor speed and position. The FOC vector control routine is adaptable to different types of speed observers. Speed observer types that could be used include the SMO (sliding-mode observer), phase locked loop (PLL) observer, full-order observer, the Kalman-filter observer, etc.

Block 145 includes the speed PI control loop 115 and flux weaken control 120, and block 150 includes block 145 in combination with the current PI control loop 125. The function of the current PI control loop 125 is to allow the motor feedback current vector $\vec{I}_s$ and current vector command $\vec{I}_s^*$ from block 145 to regulate the output voltage vector command $\vec{V}_s^*$. The function of block 145 is to regulate motor current vector command $\vec{I}_s^*$ to help keep the motor running at desired speeds.

Before the PMSM 105 is started, a measure-and-synchronize (MAS) stage 200 is executed. During windmilling, the rotor position $\theta_e$ and speed $\omega_e$ are unknown to the MCU, and this can cause the MCU to fail to start the motor 105. The new control stage 200 is used as the first control stage before the PMSM FOC vector control routine 100 is used for ongoing motor operation. During the MAS stage 200, the MCU sets the current vector command $\vec{I}_s$ to zero ($\vec{I}_s^* = 0 \Leftrightarrow I_{QREF} = 0 = I_{DREF}$). This effectively disables block 145 but allows the remaining blocks to continue. The current PI 125 control loop remains active to force the motor current vector $\vec{I}_s$ to equal zero during the MAS stage 200. At the MAS stage 200, speed observer 130 runs and estimates the rotor's position $\hat{\theta}_e$ and speed $\hat{\omega}_e$ values in real time. After the MCU receives the estimated values from the MAS 200, the MCU can use them as the initial values in block 150 of the ongoing FOC control routine 100.

The MAS stage 200 will continue for a period of time sufficient for estimated position and speed to become stable. The suitable period of delay, during which the MAS stage 200 is allowed run, varies from application to application. Although longer periods may be preferred because more time would be provided to allow estimated position and speed to converge to actual position and speed, longer delays may not be suitable for certain applications that require rapid motor startup. In many applications, the delay period may range from tens of milliseconds to hundreds of seconds.

Figure 10A:
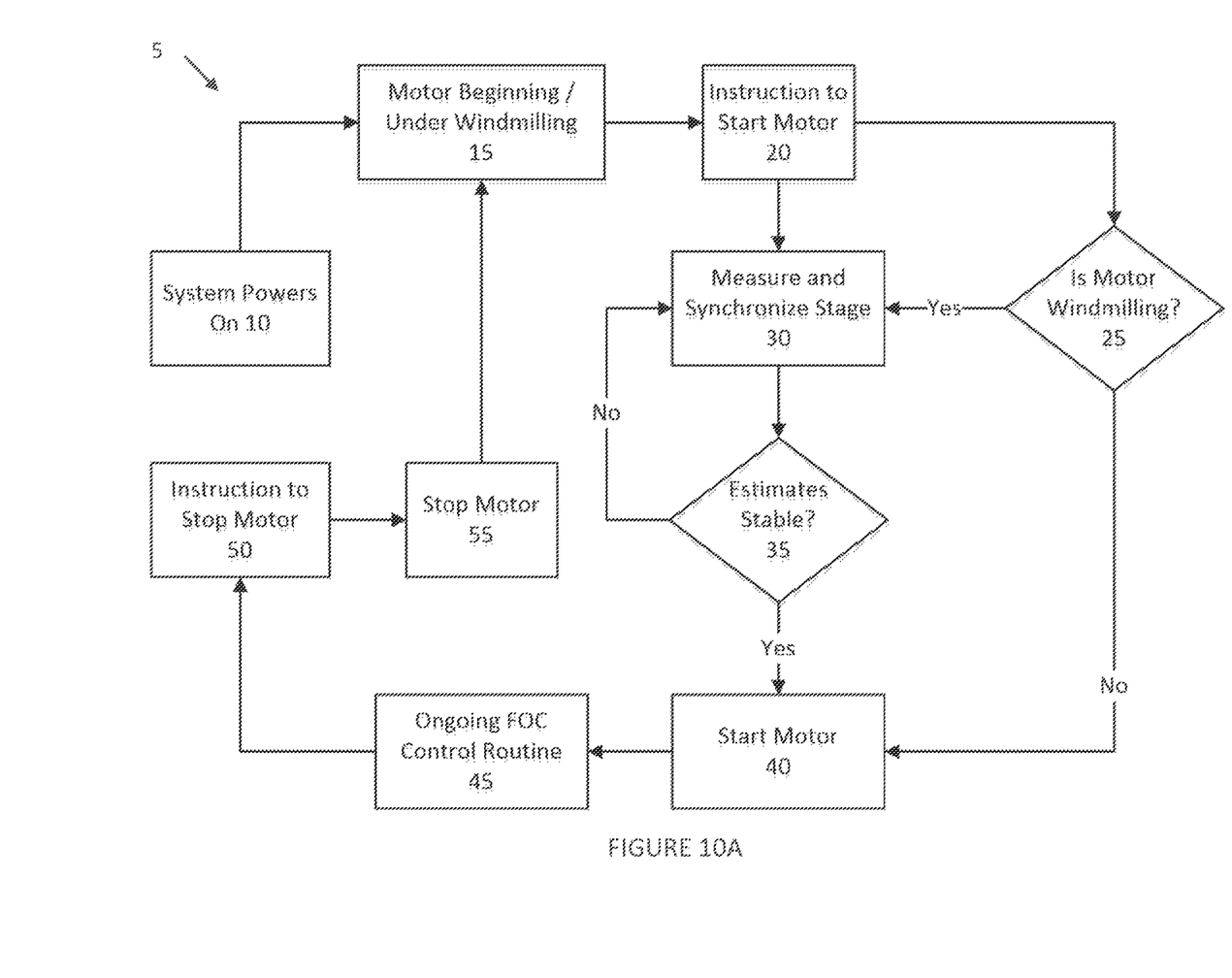
FIGS. 10A and 10B are flowcharts for exemplary processes in which a PMSM that is susceptible to windmilling may be started using the MAS stage of FIG. 9.

Referring to FIG. 10, an exemplary startup control process 5 begins with system power-on (10) and a motor that may be windmilling before startup (15). The MCU may receive a command to initiate the PMSM 105 (i.e., to start using driver 110 to run the motor 105) (20). Before the motor 105 is started, the MCU may initiate an MAS stage 200 to estimate motor speed and position (30). Following each iteration of the MAS stage 200, the MCU may evaluate whether the estimated position and speed values have stabilized (35). This could be accomplished by comparing the current speed and position estimates with the estimated speed and position of prior iterations. As the MAS stage is repeated, variations in estimates are expected to decrease (and may approach zero). If the values have not stabilized (35), the MCU returns to another iteration of the MAS stage 200 (30). But when these differences have shrunk to a sufficiently small value, the delay period may be ended, and the MCU may proceed to motor startup (40) and ongoing FOC control routine (45) for driving the PMSM 105, so as to continue the rotor's rotation according to the estimated speed and position values. This helps the motor rotate smoothly even under windmilling conditions. Once an instruction to stop the motor is received (50), the MCU may stop driving the PMSM (55). Following motor stop 55, the motor may begin windmilling again (15), and the process can repeat.

If it is to be determined whether PMSM 105 is windmilling, the MCU may optionally be configured to evaluate whether (and potentially to what extent) the PMSM 105 is windmilling (25) before executing the MAS stage 200 (30). To determine whether there is windmilling, the MCU may use the motor current sensor to determine if there are detectable motor current readings from the PMSM 105. If not, the MCU could skip steps 30 and 35 (i.e., the MAS stage 200) and proceed to motor startup 40 (and, subsequently, to FOC control (45)). This might be desirable in situations in which windmilling is not a common occurrence, and in which the time taken for the determination step (25) is expected to be smaller than the delay for executing the MAS 200 (blocks 30 and 35). Optionally, the system may allow the user to override MAS 200 stage (not shown) and skip ahead to startup (40) via a user override input and a corresponding instruction to the MCU to skip ahead.

Figure 10B:
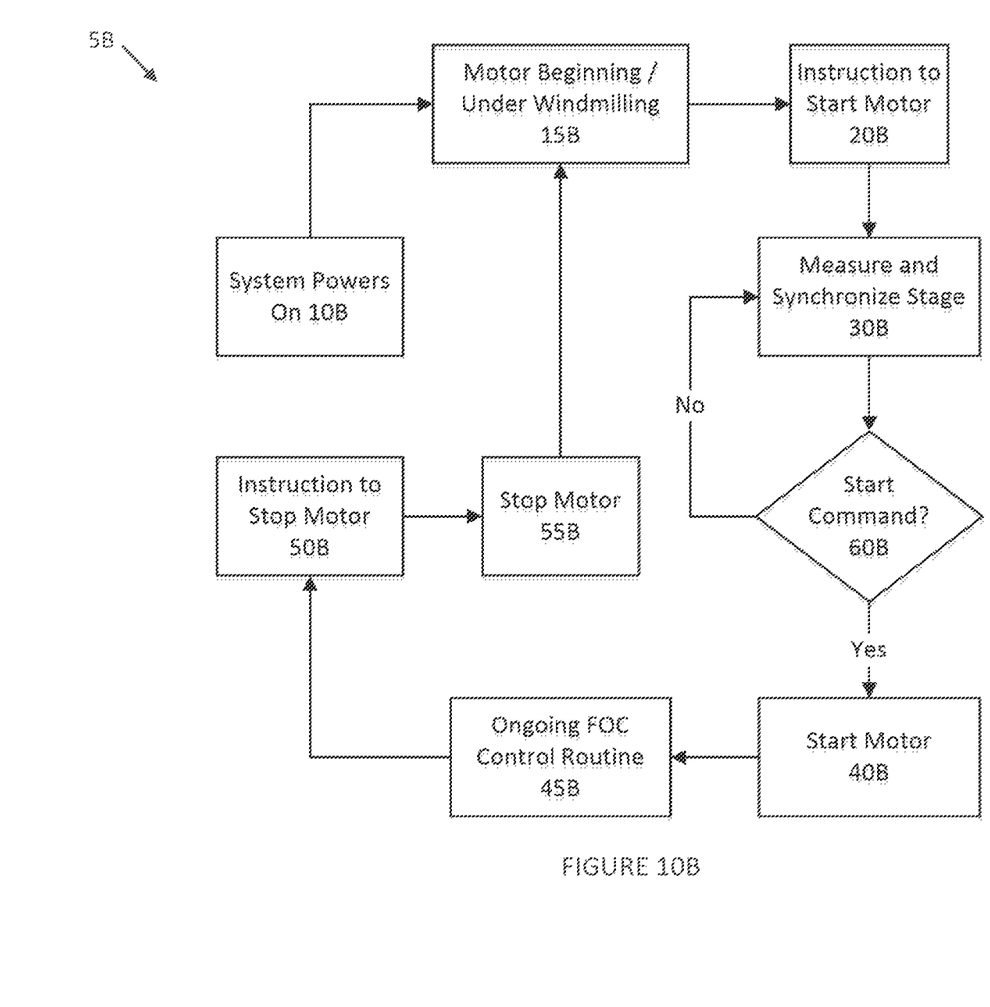

In alternative embodiments, the exemplary systems and methods can be used to control motors that require (or are otherwise operated with) frequent Run/Stop operations. Here, the controller can drive the motor using the FOC control routine (as shown in FIG. 1 and as stage 100 in FIG. 9) following a Run command. When the controller receives a Stop command, the controller will allow the system and motor to enter Stage 200 (FIG. 9), and the motor will be driven by a zero current vector. The speed observer 130 will estimate the motor speed and position in real time, and the MCU will have the estimated values during a Stop command period. Once the controller receives a Run command, the system can enter Stage 100 immediately because the MCU already knows the motor accurate estimated speed and position values because Stage 200 continues to work during the Stop command period. Because a zero current vector is applied to the motor, the contribution of torque actuating on the motor can be ignored while the system is under Stop command status, as experienced under real stop situations. Certain versions of such alternative embodiments are represented by process 300 in FIG. 10B, in which the MAS step (315) is run until a Run command is received (310).

The present disclosure has been described in terms of one or more embodiments, and it should be appreciated that many equivalents, alternatives, variations, additions, and modifications, aside from those expressly stated, and apart from combining the different features of the foregoing versions in varying ways, can be made and are within the scope of the invention.

I claim:

1. A motor controller configured to drive a permanent magnet synchronous motor (PMSM), the motor controller including a processor and a non-transitive machine-readable medium, the medium including instructions, the instructions, when loaded and executed by the processor, configure the motor controller to:
   receive a command to start the PMSM;
   before starting the PMSM, estimate position and speed of the PMSM by using a field-oriented control (FOC) vector control routine;
   during the FOC vector control routine, disable a speed proportional-integral (PI) control loop, wherein a current value output from the PI control loop is set to substantially zero to disable the speed PI control loop until an initial value for position and speed is estimated;
   start the PMSM using the estimated position and speed as initial speed and position of the rotor; and
   use the FOC vector control routine, with the speed PI control loop enabled, to drive the PMSM.

2. The motor controller of claim 1, wherein the motor controller is further configured to:
   during the FOC vector control routine, perform a flux-weaken routine; and
   disable the flux-weaken routine to estimate position and speed of the PMSM.

3. The motor controller of claim 1, wherein the motor controller is further configured to drive the PMSM without received sensor readings for speed and position.

4. The motor controller of claim 1, wherein the motor controller is further configured to:
   during the FOC vector control routine, perform speed observation wherein motor current and voltage are received as inputs and position and speed are determined as outputs;
   repeat the FOC vector control routine multiple times when estimating position and speed before starting the PMSM; and
   converge estimated position and speed to actual position and speed through successive iterations of the FOC vector control routine.

5. The motor controller of claim 4, wherein the motor controller is further configured to loop the FOC vector control routine until the estimated position and speed have stabilized such that there is substantially no variability in estimated position and speed between successive loops.

6. The motor controller of claim 1, wherein the motor controller is further configured to perform, during the FOC vector control routine, a current proportional-integral (PI) control loop configured to output voltages used to drive the PMSM.

7. The motor controller of claim 1, further comprising a current sensor configured to:
   measure a motor current of the PMSM; and
   to provide the motor current to the motor controller.

8. The motor controller of claim 7, wherein the motor controller is further configured to, during the FOC vector control routine, perform speed observation to determine speed and position based upon motor current input.

9. The motor controller of claim 8, wherein the motor controller is further configured to, during the FOC vector control routine, perform a proportional-integral (PI) control loop configured to output voltages for speed observation.

10. The motor controller of claim 1, wherein
   a delay until an initial value for position and speed is estimated ranges from tens of milliseconds to hundreds of seconds.

11. The motor controller of claim 1, wherein the motor controller is further configured to:
   during the FOC vector control routine, perform a flux-weaken routine;
   disable the flux-weaken routine when using the FOC vector control routine when estimating position and speed of the PMSM before startup.

12. The motor controller of claim 11, wherein the motor controller is further configured to:
   during the flux-weaken routine, identify a current value; and
   set the current value to substantially zero to disable the flux-weaken routine to estimate position and speed of the PMSM before startup.

13. The motor controller of claim 1, wherein the motor controller is further configured to drive the PMSM through a motor drive circuit having a multiphase bridge configured to provide the PMSM with a voltage vector.

14. A system, comprising:
   a permanent magnet synchronous motor (PMSM) via field-oriented control (FOC), the PMSM including a rotor that is rotatable;
   a motor controller including a processor and a non-transitive machine-readable medium, the medium including instructions, the instructions, when loaded and executed by the processor, configure the motor controller to:
   receive a command to start the PMSM;
   before starting the PMSM, estimate position and speed of the PMSM by using a field-oriented control (FOC) vector control routine in which both a speed proportional-integral (PI) control loop and a flux-weaken routine are disabled, wherein a current value output from the PI control loop is set to substantially zero to disable the speed PI control loop until an initial value for position and speed is estimated;
   start the PMSM using the estimated position and speed as initial speed and position of the rotor; and
   use the FOC vector control routine, with the speed PI control loop enabled, to drive the PMSM.

15. A method of controlling a permanent magnet synchronous motor (PMSM) with a rotor, comprising:
   receiving a command to start the PMSM;
   before starting the PMSM, estimating position and speed of the PMSM by using a field-oriented control (FOC) vector control routine in which a speed proportional-integral (PI) control loop is disabled, wherein a current value output from the PI control loop is set to substantially zero to disable the speed PI control loop until an initial value for position and speed is estimated;
   starting the PMSM using the estimated position and speed as initial speed and position; and
   using the FOC vector control routine, with the speed PI control loop enabled, to drive the PMSM.

16. The method of claim 15, wherein when position and speed are being estimated, a flux-weaken routine of the FOC vector control routine is disabled.

17. The method of claim 15, further comprising:
   during the FOC vector control routine, performing a speed observation using a motor current as input and to identify position and speed as outputs;
   repeating the FOC vector control routine multiple times when estimating position and speed before PMSM startup; and
   converging the estimated position and speed values towards actual position and speed through successive iterations of the FOC vector control routine.

18. The method of claim 17 further comprising:
using a current sensor to measure a motor current of the PMSM; and
inputting the motor current into a speed observer and receiving speed and position as outputs.

19. The method of claim 18, wherein the FOC vector control routine further includes a current proportional-integral (PI) control loop that outputs voltages, the method further comprising providing the voltages output by the current PI control loop to the speed observer.

20. The method of claim 15, performed without receiving position and speed measurements from sensors.

* * * * *